United States Patent
Lu et al.

(10) Patent No.: US 7,787,668 B2
(45) Date of Patent: Aug. 31, 2010

(54) METHOD FOR CAPTURING AND MAPPING FINGERPRINT IMAGES AND THE APPARATUS FOR THE SAME

(75) Inventors: Zhou Lu, Beijing (CN); Huazhang Yu, Beijing (CN)

(73) Assignee: Feitian Technologies Co., Ltd., Haidian District, Beijing (CN)

( * ) Notice: Subject to any disclaimer, the term of this patent is extended or adjusted under 35 U.S.C. 154(b) by 914 days.

(21) Appl. No.: 11/618,371

(22) Filed: Dec. 29, 2006

(65) Prior Publication Data
US 2007/0086631 A1   Apr. 19, 2007

(51) Int. Cl.
*G06K 9/00* (2006.01)
(52) U.S. Cl. .................. 382/124; 340/5.83; 382/278; 382/284
(58) Field of Classification Search ............. 340/5.83; 345/156, 174; 382/124, 126, 278, 284, 313
See application file for complete search history.

(56) References Cited

U.S. PATENT DOCUMENTS

| | | | | |
|---|---|---|---|---|
| 5,748,766 A | * | 5/1998 | Maase et al. | 382/124 |
| 6,597,802 B1 | * | 7/2003 | Bolle et al. | 382/124 |
| 7,095,880 B2 | * | 8/2006 | Martinez et al. | 382/124 |
| 7,164,411 B2 | * | 1/2007 | Keranen et al. | 345/156 |
| 7,463,756 B2 | * | 12/2008 | Benkley, III | 382/126 |
| 2003/0091219 A1 | * | 5/2003 | Martinez et al. | 382/124 |
| 2003/0123714 A1 | * | 7/2003 | O'Gorman et al. | 382/124 |
| 2005/0265587 A1 | * | 12/2005 | Schneider | 382/124 |
| 2007/0086631 A1 | * | 4/2007 | Lu et al. | 382/124 |

* cited by examiner

*Primary Examiner*—Gregory M Desire
(74) *Attorney, Agent, or Firm*—Husch Blackwell Sanders Welsh Katz

(57) ABSTRACT

The present invention relates to a fingerprint image capture process control method and the apparatus thereof particularly to a method for capturing and mapping fingerprint images and the apparatus for the same. The present invention determines the proper direction of mosaicing the slices to get correct fingerprint image by comparing the leading and trailing image blocks of two adjacent slices (frames) and uses the direction that is more affinitive as forward capture direction after the comparison. In addition, the identification of image direction may be processed repeatedly while mosaicing the slices, and calibrating the capture direction at any time while mosaicing the slices is allowed, thereby the error rate in mosaicing the slices is reduced and the efficiency of capturing and mapping fingerprint images is increased.

14 Claims, 2 Drawing Sheets

METHOD FOR CAPTURING AND MAPPING FINGERPRINT IMAGES AND THE APPARATUS FOR THE SAME

The present invention relates to a fingerprint image capture process control method and the apparatus thereof, and more particularly, to a method for capturing and mapping fingerprint images and the apparatus for the same.

BACKGROUND OF THE INVENTION

In recent years, with the rapid development of the Internet technologies and the biometric identification technologies, some sophisticated fingerprint identification products have come into use rapidly in daily work and life. Currently, the fingerprint capture apparatus has evolved from flat capture to scan capture, which only requires the users sweep their finger balls on the sensor to get their fingerprint images. The cost of a scan capture chip is far less than that of a touch capture chip or an optical sensor for its compactness. And its dynamic and static power consumption is very low. Presently, this kind of fingerprint capture apparatus is applied broadly. Its capture principle is: the finger sweeps towards a specific direction, and the sensor captures many fingerprint image slices (frames) at the same time, then it figures out a full fingerprint image by mosaicing the slices with a fixed mosaicing algorithm. The slices are mosaiced in terms of gray scales, because the gray scale values of some pixels in two sequential frames are identical or similar. As the sweep direction is defaulted, it is not considered during mosaicing. However, if the sweep direction is reverse, the resulting image will be incorrect according to the original algorithm and cannot be further used to authenticate a user. Hence it is so inconvenient that the users must determine the sweep direction before they use a fingerprint capture apparatus.

SUMMARY OF THE INVENTION

The present invention overcomes the above defects and provides a method for identifying the sweep direction and determining the mosaicing direction of captured fingerprint image slices, and the apparatus for the same.

The solution of the present invention to the technical problems is: a method for capturing and mapping fingerprint images—first capturing fingerprint image slices frame by frame, and then mosaicing captured frames into a full fingerprint image, with a step of identifying the capture direction of image slices in between, comprising the following steps of:
1) picking up two adjacent image frames captured;
2) conducting cross-comparison on the leading and trailing image blocks of the two frames;
3) using the direction that is more affinitive as forward capture direction.

The process of cross-comparison further comprises the following steps of:
1) evaluating forward affinity—picking up at least one image block between the minimum and maximum blocks from leading row to trailing row in the first frame respectively, then picking up corresponding block(s) with relevant size to that of the block(s) picked up in the first frame from trailing row to leading row in the second frame respectively, and evaluating the minimum affinity between the pertinent blocks as forward affinity;
2) evaluating backward affinity—picking up at least one image block between the minimum and maximum blocks from leading row to trailing row in the second frame respectively, then picking up corresponding block(s) with relevant size to that of the block(s) picked up in the second frame from trailing row to leading row in the first frame respectively, and evaluating the minimum affinity between the pertinent blocks as backward affinity;
3) determining the more affinitive direction by comparing the resulting affinity values: the more affinitive direction has a higher affinity value.

The evaluation of affinity values may use the distance function of gray scale values.

The distance function of gray scale values may refer to the variance calculation of gray scale values.

Each image block may contain at least one image row, and the affinity between the image blocks is the average of affinity values between each of the image rows in the blocks.

The identification of image direction may be processed repeatedly while mosaicing the slices.

The process of selectively removing some image slices captured may be included prior to picking up adjacent image slices.

An apparatus based on above method for capturing fingerprint image, comprising a master chip, and a communication module and a sensor, which are connected to the master chip respectively; and the sensor is a scan type sensor, which is a temperature sensor, a capacitance sensor, a photoelectric sensor or a pressure sensor.

The master chip may be a microprocessor or smart card chip comprising a Central Processing Unit (CPU), a Micro Controller Unit (MCU) or a Single Chip Micyoco (SCM).

The communication module may be built into the master chip or be separate from the master chip.

The benefits of the present invention compared to the existing technologies are: determining the proper direction of mosaicing the slices to get correct fingerprint image by comparing the leading and trailing image blocks of two adjacent slices (frames) and using the direction that is more affinitive as forward capture direction after the comparison. In addition, the affinity between image blocks is measured by the values of affinity evaluated from the distance function of gray scale values of pertinent pixel points. This evaluation method is easy and intuitive, the identification of image direction may be processed repeatedly while mosaicing the slices, and calibrating the capture direction at any time while mosaicing the slices is allowed, thereby the error rate in mosaicing the slices is reduced and the efficiency of capturing and mapping fingerprint images is increased.

BRIEF DESCRIPTION OF THE DRAWINGS

The present invention may be further understood from the following description in conjunction with the appended drawings. In the drawings.

DETAILED DESCRIPTION OF THE EMBODIMENTS

Figure 1:
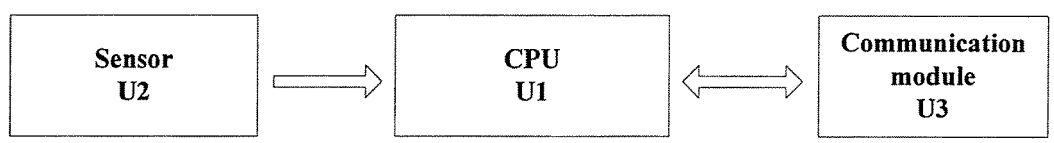
FIG. 1 is a principle block diagram of the apparatus according to the present invention.

Referring to FIG. 1, the fingerprint image capture apparatus according to the present invention comprises a CPU (Central Processing Unit) U1 as a master chip, which is connected to a sensor U2 and a communication module U3 respectively. The sensor U2 captures fingerprints frame by frame at a preset interval and converts them to images that can be recognized by the CPU. The images are made up of pixel points whose gray scales are different. The sensor may be a temperature sensor, a capacitance sensor, or a photoelectric sensor, or the like, which works distinctly, but can reflect the fingerprint feature information. The communication module is connected to a PC or other device that requires authentication via a universal interface.

Figure 2:
FIG. 2 is an image of the first slice of the two adjacent image slices.
Figure 3:
FIG. 3 is an image of the second slice of the two adjacent image slices.

While the finger sweeps on the sensor U2, the sensor will capture many fingerprint image frames consecutively. FIG. 2 and FIG. 3 show two adjacent image slices which are captured sequentially. Setting a short interval can ensure that there is at least one block in the first slice that matches one block in the second slice (or they can be treated as matched). The matched extent can be measured with the affinity, because the gray scale values of some pixels in two sequential frames are identical or similar. The affinity is a distance function of the gray scale values of pertinent pixel points. Here the distance function is a variance calculation, for example:

To define the affinity between image rows: use row comparison, i.e. pick up one random row from the two frames respectively, and the affinity between the two rows can be expressed as the sum of squares of the differences between gray scale values of the pertinent pixel points, in which smaller sum indicates higher affinity, that is to say that the two rows are more matched;

To define the affinity between image blocks: pick up sequential n rows from the two frames respectively to form two blocks, calculate the affinity values of pertinent rows in the two blocks, and sum up the values and average the summation, and the result will be the affinity, in which particularly when n equals to 1, the result is the affinity between the pertinent rows.

According to above algorithms, evaluate the affinity between a forward picked image block in the first image slice in FIG. 2 and a backward picked image block in the second image slice in FIG. 3 and the affinity between a backward picked image block in the first image slice in FIG. 2 and a forward picked image block in the second image slice in FIG. 3 respectively, and compare the two resulting values. If the former is less than the latter, then the forward picked block in FIG. 2 is more matched the backward picked block in FIG. 3. Therefore, the capture direction of the image is backward. Later, the image slices should be mosaiced backward. Contrarily, the capture direction of the image is forward and the image slices should be mosaiced forward later. The word "forward" means that the image slices are sorted by the time they are captured, first captured first mosaiced. Accordingly, the word "backward" means that the image slices are sorted by the time they are captured, but first capture last mosaiced.

In particular, once the sensor U2 has detected that a finger is sweeping, it will begin to capture an image. It can capture at least two sequential image frames first. The size of each frame can be set to i rows, j columns. For example, we set the size to 8 rows, 280 columns here.

Figure 4:
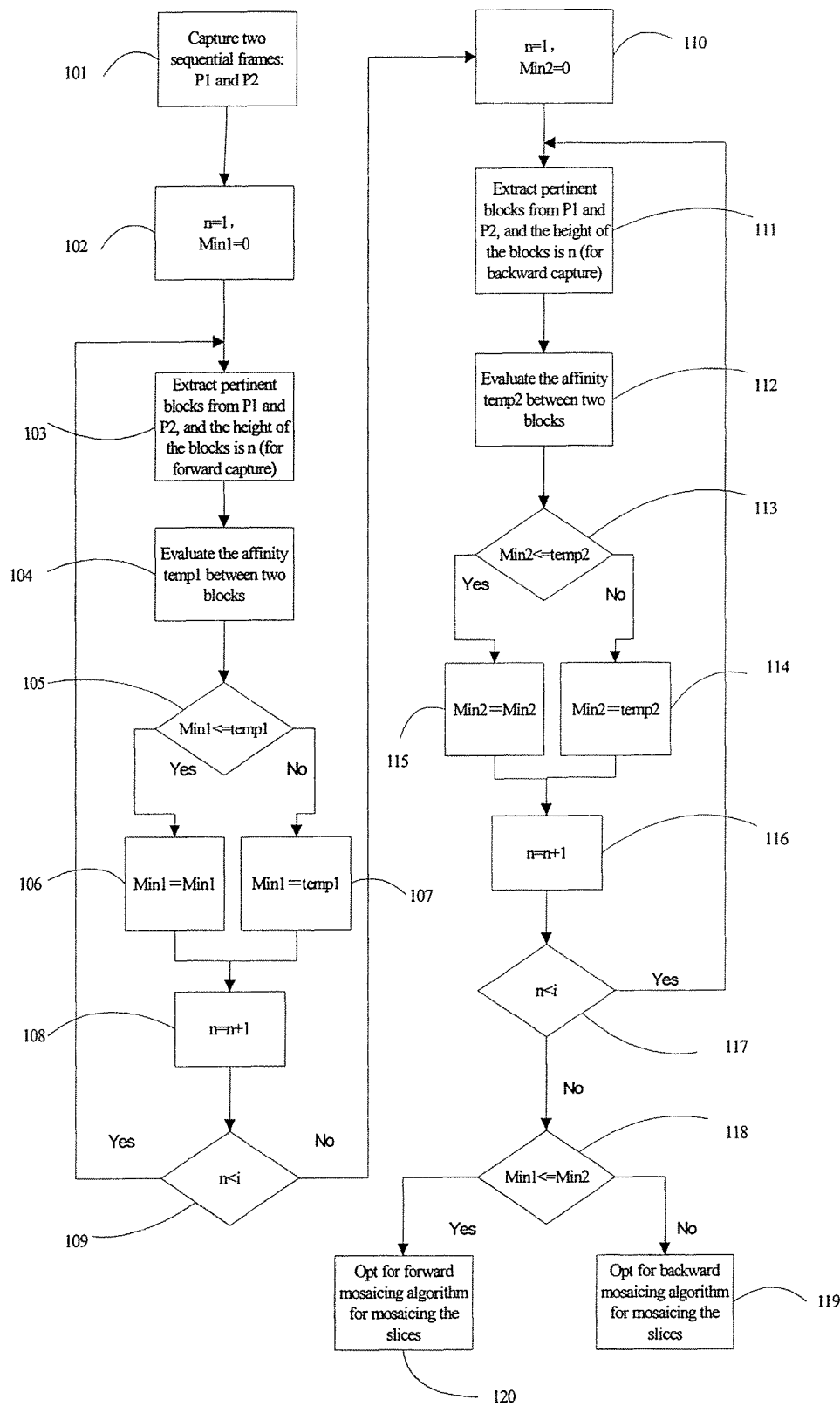
FIG. 4 is a work flow schematic of the method according to the present invention.

Referring to FIG. 4, capture two sequential frames first as shown in Step 101, and evaluate the minimum affinity between i blocks captured forward. As shown in Steps 102 to 108, the value of minimum affinity and the location of image blocks at this point when capturing the blocks in this direction are concluded using the traversal method. The minimum affinity can also be concluded using dichotomy or other quick lookup methods. Because the number of rows in a block can be 1 to n, first we pick up n rows upward from row i in FIG. 2 (n=2, 3 . . . i), then we pick up n rows downward from row 1 in FIG. 3 (where row n−1 in FIG. 3 corresponds to row i in FIG. 2) and evaluate the affinity temp1 between these i−1 blocks from n=2 to n=i. Then, use the minimum affinity value Min1 as the affinity of forward capture.

Next, evaluate the minimum affinity between the i−1 blocks captured backward. The method used is the same as above. As shown in Steps 109 to 115, the value of minimum affinity and the location of image blocks at this point when capturing the blocks in this direction are concluded using the traversal method. But the blocks captured are different. We pick up n rows downward from row 1 in FIG. 2, and pick up n rows upward from row i in FIG. 3, where row n−1 in FIG. 2 corresponds to row i in FIG. 3, and evaluate the affinity temp2 between these i−1 blocks from n=2 to n=i. Then, use the minimum affinity value Min2 as the affinity of backward capture.

Compare the two affinity values Min1 and Min2, as shown in Step 116. If Min1 is less than or equal to Min2, then opt for forward mosaicing algorithm to mosaic the frames. Otherwise, opt for backward mosaicing algorithm to mosaic the frames, as shown in Step 117 and 118. With this method, the users do not need to consider the sweep direction of finger any more. The apparatus of the present invention can recognize the sweep direction of finger automatically, and mosaic in proper direction to capture a correct fingerprint image using appropriate mosaicing algorithm. The gray scales of pixel points may be gradual values from 0 to 255, or binary values of 0 and 1.

The identification of capture direction of image slices above can be processed only once at the beginning of image capture. For the subsequent captures, the capture direction is defaulted to the same direction. This is especially applicable to one-time unidirectional sweeps, and this method requires less calculation volume. It is also feasible that the identification is processed each time two adjacent frames are captured to determine the capture direction of the two frames for mosaicing, so that the capture direction is calibrated frequently while mosaicing the slices to reduce the error rate in mosaicing. This is especially applicable to the case of direction changes for bidirectional or repeated sweeps, and however, this method requires more calculation volume. Depending on the actual situation, reasonable calculation and identification method can be adopted to perform multiple identification operations, for example, setting how frequent the identification is processed, or after how many images are mosaiced the next identification operation can start is possible.

In the particular case of setting n=1 all the time, i.e. using the affinity between rows for identifying only, we can compare the minimum affinity Min1 between the first (or last) row of the first frame and the second frame with the minimum affinity Min2 between the first (or last) row of the second frame and the first frame. If Min1 is not greater than Min2, then the scan direction is backward (or forward), and vice versa.

In above process, it is possible to identify the direction of fingerprint image capture and mosaic the image slices in the master chip U1, and transfer the full information of mosaiced image via the communication module U3 or transfer the result via the communication module U3 directly after determining whether the information is valid.

During the capture of fingerprint slices, if the finger sweeps very slowly, or the sensor's capture progresses too fast, there may be a large area that is overlapped in the two adjacent frames captured. As a result, the calculation volume for minimum affinity will be huge. Therefore, it is better to remove some captured image slices alternatively, then pick up two adjacent frames from the remaining to compare, thus, the calculation volume for the whole process of identifying the direction and mosaicing the slices can be reduced significantly.

The present invention is also applicable to other biometric capture and imaging processes that are based on a scan method besides the fingerprint capture.

The method for capturing and mapping fingerprint images and the apparatus for the same according to the present invention are described in details above. It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

The invention claimed is:

1. A method for capturing and mapping fingerprint images—first capturing fingerprint image slices frame by frame, and then mosaicing captured frames into a full fingerprint image, wherein a step of identifying the capture direction of image slices is included in between foregoing two steps, comprising the following substeps of:
   1) picking up two adjacent image frames captured;
   2) conducting cross-comparison on the leading and trailing image blocks of the two frames;
   3) using the direction that is more affinitive as forward capture direction after comparing, wherein the process of cross-comparison further comprises the following steps of:
   1) evaluating forward affinity—picking up at least one image block between the minimum and maximum blocks from leading row to trailing row in the first frame respectively, then picking up corresponding block(s) with relevant size to that of the block(s) picked up in the first frame from trailing row to leading row in the second frame respectively, and evaluating the minimum affinity between the pertinent blocks as forward affinity;
   2) evaluating backward affinity—picking up at least one image block between the minimum and maximum blocks from leading row to trailing row in the second frame respectively, then picking up corresponding block(s) with relevant size to that of the block(s) picked up in the second frame from trailing row to leading row in the first frame respectively, and evaluating the minimum affinity between the pertinent blocks as backward affinity;
   3) determining the more affinitive direction by comparing the resulting affinity values: the more affinitive direction has a higher affinity value.

2. The method according to claim 1, wherein each image block contains at least one image row, and the affinity between the image blocks is the average of affinity values between each of the image rows in the blocks.

3. The method according to claim 2, wherein the evaluation of affinity values uses the distance function of gray scale values of the pixel points.

4. The method according to claim 3, wherein the distance function of gray scale values refers to the variance calculation of gray scale values.

5. The method according to claim 2, wherein the identification of image direction is processed repeatedly while mosaicing the slices.

6. The method according to claim 2, wherein the process of selectively removing some captured image slices is included prior to picking up adjacent image slices.

7. The method according to claim 1, wherein the evaluation of affinity values uses the distance function of gray scale values of the pixel points.

8. The method according to claim 7, wherein the distance function of gray scale values refers to the variance calculation of gray scale values.

9. The method according to claim 1, wherein the evaluation of affinity values uses the distance function of gray scale values of the pixel points.

10. The method according to claim 9, wherein the distance function of gray scale values refers to the variance calculation of gray scale values.

11. The method according to claim 1, wherein the identification of image direction is processed repeatedly while mosaicing the slices.

12. The method according to claim 1, wherein the identification of image direction is processed repeatedly while mosaicing the slices.

13. The method according to claim 1, wherein the process of selectively removing some captured image slices is included prior to picking up adjacent image slices.

14. The method according to claim 1, wherein the process of selectively removing some captured image slices is included prior to picking up adjacent image slices.

* * * * *